Jan. 9, 1923.

H. SIMON.
MAGAZINE SCREW DRIVER AND METHOD OF OPERATING SAME.
FILED JAN. 20, 1922.

WITNESSES
Howard D. Orr.
H. T. Chapman.

Henry Simon, INVENTOR,
BY E. G. Siggers
ATTORNEY

Jan. 9, 1923.
H. SIMON.
MAGAZINE SCREW DRIVER AND METHOD OF OPERATING SAME.
FILED JAN. 20, 1922.
1,441,950.
4—SHEETS—SHEET 4.

Henry Simon, INVENTOR,

WITNESSES
Howard D. Orr.
H. T. Chapman.

BY E. G. Siggers.
ATTORNEY

Patented Jan. 9, 1923.

1,441,950

UNITED STATES PATENT OFFICE.

HENRY SIMON, OF SANTA ANA, CALIFORNIA.

MAGAZINE SCREW DRIVER AND METHOD OF OPERATING SAME.

Application filed January 20, 1922. Serial No. 530,538.

*To all whom it may concern:*

Be it known that I, HENRY SIMON, a citizen of the United States, residing at Santa Ana, in the county of Orange and State of California, have invented new and useful Improvements in Magazine Screw Drivers and Methods of Operating Same, of which the following is a specification.

This invention has reference to multiple tools, and more particularly to multiple screw drivers, although the invention may be applied to certain other types of multiple tools, but for simplicity of description, this specification will refer to a multiple screw driver, without necessarily being confined thereto.

The primary object of the invention is to provide a screw driver with a magazine shell to contain a plurality of blades, which may be made instantly available for use by a simple movement of the screw driver and without removing them from the magazine.

In the ordinary magazine screw driver, several blades are carried loosely in the handle, and in order to change the blades, it is necesary to remove the cap which closes the end of the handle, take out a blade, insert it in the chuck, close the chuck and fasten the cap again in place.

The present invention reduces the number of operations, for the blades need not be removed except for cleaning or grinding. By a manipulation of the tool in different directions, different blades are made to move into position in the chuck, where they are securely locked by a slight movement and may be as easily removed.

In accordance with the invention, there is provided a handle of appropriate size, in which are housed a plurality of screw driver blades of different sizes, or specifically different capacities, and so arranged that any chosen one of the blades may be projected from the handle or housing into position for use, to the exclusion of the other blades, and the chosen blade is there locked against retraction by a form of clamp or chuck.

I have disclosed two different embodiments of the invention. They differ from each other in the method of fastening or holding the blade in projected position. The fundamental arrangement and operation of the change mechanism is the same in both forms. It consists of a shell so constructed as to receive three flat blades, and provided with means to hold them against rotary movement while permitting the blades a definite transverse movement equal to about twice the thickness of a single blade. When the tool is held with the flat faces of the blades horizontal, the top blade will always be located centrally in the shell, and then by tilting the tool downwardly, the top blade will slide through a slot or opening provided in the chuck, where it may be quickly locked in a firm position. Upon turning the tool with the flat sides of the blades vertical, the middle blade then assumes a central position and is brought into action in the same manner.

It will be noted that when the blade is in its working position, it is fixed at its base into the handle, the latter taking all the strains while the chuck merely serves to hold the blades from moving out of position.

The invention will be best understood from a consideration of the following detailed description, taken in connection with the accompanying drawings forming part of this specification, with the understanding, however, that the invention is not confined to any strict conformity with the showing of the drawings, but may be changed and modified, so long as such changes and modifications mark no material departure from the salient features of the invention, as expressed in the appended claims.

In the drawings:

Figure 8ª is a view similar to Figure 8, illustrating the position assumed by the screw-driver when it is desired to project the middle blade.

Referring to the form of screw driver illustrated in Figures 1 to 13 inclusive, there is shown a handle or casing 1, of generally cylindrical form, and which may be of relatively small size, and is usually drawn or turned from metal of convenient size to be held in the hand and to contain a plurality of screw driver blades 2, also formed of stamped metal of appropriate shape and rigidity, and of even thickness throughout, except at the point which is tapered as usual.

Figure 1:
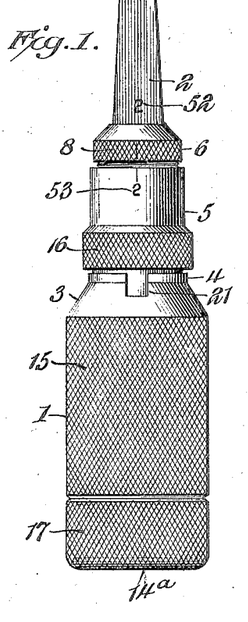
Figure 1 is an elevation of a screw driver structure embodying the invention, and showing one of the blades projecting and clamped.
Figure 2:
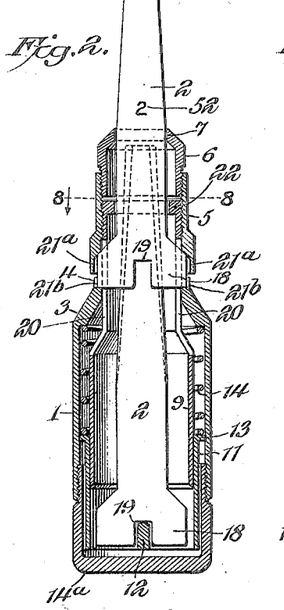
Figure 2 is a longitudinal central section of the screw driver structure with some parts in elevation, and otherwise corresponding to the showing of Figure 1.
Figures 5, 6, 7, 8, 8A, 9, 10, 11, 12, 13:
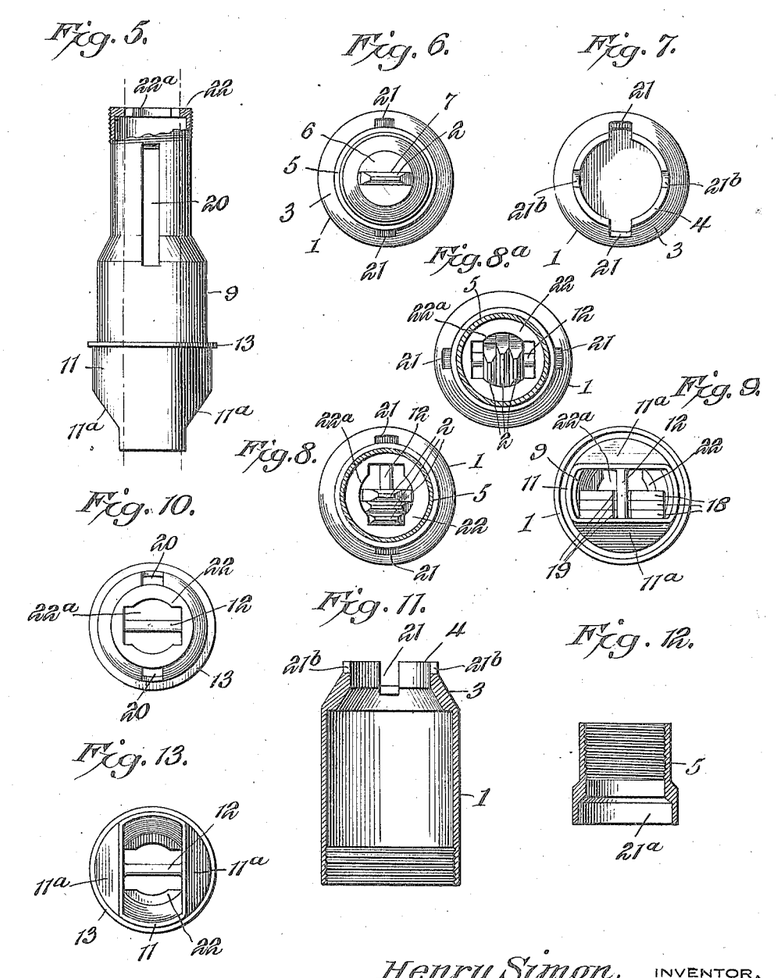
Figure 5 is an elevation of the change-shell, shown in the structure of Fig. 2 and associated figures.
Figure 6 is a top view of the magazine screw driver of Fig. 1 with the blade in position.
Figure 7 is a top view of the casing or handle, with the change-shell removed.
Figure 8 is a section on the line 8—8 of Fig. 2, but with the screw driver in a horizontal position, showing how either end blade is positioned for projection.
Figure 9 is a bottom end view of the screw driver with the cap removed and the screw driver in a horizontal position.
Figure 10 is a top view of the change-shell.
Figure 11 is a sectional view of a portion of the handle or casing.
Figure 12 is a sectional view of the slidable sleeve.
Figure 13 is a bottom view of the change-shell.

The casing or handle 1 comprises a body portion contracted at its front end to form a neck 3, and terminating in a short straight annular flange 4, smaller in diameter than the body portion. The other end of the casing is internally threaded to receive a threaded cap 14ª, which closes the lower end of the handle. In the flange 4 are formed a pair of slots 21ᵇ, diametrically disposed, and at right angles thereto are another pair of slots 21 which are deeper and wider than the slots 21ᵇ for they extend into the neck 3 (Figs. 7 and 11). The slots 21ᵇ receive the wide end of the blade when the latter is locked in position (Fig. 2).

A rotatable and longitudinally slidable sleeve 5 is located at the front end of the handle, into which there is screwed or otherwise secured, a chuck 6, having a terminal transverse slot 7 therethrough, said slot being of a length and diameter to allow a single blade to pass. The chuck is exteriorly milled as shown at 8, to provide a convenient finger hold, whereby the chuck may be rotated when necessary.

In order to facilitate the handling of the screw driver assembly, the exterior surface thereof may be milled or roughened, as shown at 15, 16 and 17, to improve the grip on the exterior surface of the device.

Carried by and movable with the sleeve 5 is the upper or outer end of an elongated change-shell 9, to which it is secured by screw-threads. The change-shell is of generally cylindrical form, enlarging in diameter toward the lower or rear end, and stopping short of the interior of the shell or casing 1, where the change-shell 9 carries another sleeve 11, reaching close to the bottom of the casing 1, said sleeve 11 being provided with a narrow transverse bar 12, diametric of said sleeve 11, which latter terminates at its upper end within the casing 1 in an outstanding circumferential flange 13, between which and the upper conical portion 3 of the casing, there is lodged a coiled spring 14, tending to urge the change-shell toward the bottom of the casing 1. The sleeve 11 is flattened on opposite sides at its lower end, as indicated at 11ª. The bar 12 connects the flat sides as shown in Fig. 13. As the sleeve 11 is connected to the change-shell 9, this imparts to the sleeve a spring action in harmony with the change-shell. As a result, the sleeve 5, change-shell 9 and lower sleeve 11 are caused to move in unison. The change-shell contains the means for controlling the selection of the blade besides serving as a magazine therefor. This will be explained in detail later.

The butt ends of the screw driver blades are expanded as shown at 18, and each has a central notch or recess 19, to fit over and loosely receive the bar 12, and thus hold the blades from turning movement.

Near the upper or outer end of the change-shell 9, there are provided diametrically opposite longitudinal slots 20, which aline with and are of the same width but are longer than the slots 21 of the casing (see Fig. 11), so that when a screw driver blade 2 is moved outwardly, the expanded end 18 of the blades, passes through the slots 20 of the change-shell and enters the enlarged or bell-shaped lower end 21ᵃ of the sleeve 5, and the lower end of the projected screw driver blade will first engage the slots 21. Though the neck portion 3 is narrower than the end of the blade, the slots 21 allow the said end to pass out. By pulling the sleeve 5 outwardly against the tension of the spring 14 and then turning the sleeve 5, which causes the change-shell to turn and likewise turns the blades, the lower end of the blade is thereby freed from the slots 21 and rides upon the flange 4 of the casing 1, until the shallow recesses 21ᵇ are reached, then the sleeve 5 is released and the lower end of the projected blade becomes locked in the recesses 21ᵇ. It is so held by the sleeve 5 engaging the expanded end 18 of the butt end of the blade. The other screw driver blades are housed in the handle 1, and have the recesses 19 at their rear ends engaging the bar 12 and interlocked therewith.

In order to facilitate the positioning or indexing of the blades 2, so that they may be properly projected as desired, the blades and the sleeve 5 are provided with coacting indicia 52, 53, each blade being given a different number, thereby indicating to the user which blade will be moved into position by gravity and locked for use.

The means for determining the movements of the blades are located at the ends of the change-shell. At the upper end of the change-shell there is a web 22, having an opening 22ᵃ therethrough of partially circular and partially rectangular outline. This opening may be described in two ways, either as circular with straight-sided notches formed on opposite sides, or as rectangular with curved recesses at opposite sides. These notches are wide enough to permit the outside blades to lie loosely in them. The distance between the straight sides of the notches is a trifle over five times the thickness of a blade (Fig. 8). The distance between the centers of the curved sides is a trifle more than the width of the shank of a blade.

The flattened sides 11ᵃ at the other end of the change-shell are alined with the straight sides of the opening 22ᵃ of the web 22 (Figs. 9 and 13), and are the same distance apart, viz: about five times the thickness of a screw driver blade.

Figure 3:
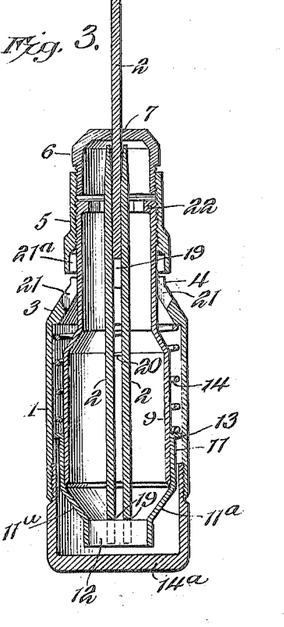
Figure 3 is a longitudinal central section through the screw driver structure in a plane at right angles to the showing of Fig. 2.
Figure 4:
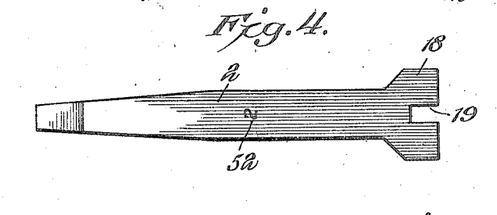
Figure 4 is a plan view of one of the screw driver blades.

The proportions of the change-shell and the blades are such that when the screw driver is in a horizontal position, with the flat sides of the blades also assuming a horizontal position, the blades will lie one on top of the other, with the lowermost blade at the forward end lying flat on one of the straight sides of the peculiarly shaped opening 22ᵃ provided in the web 22, and at the rear end the lowermost blade rests upon the flat portion which is connected by the bar 12. In the vertical position of the tool, with one of the blades in projected position, the blades will be arranged as indicated in Figure 3; but when the blades are retracted within the change-shell, and the tool is moved to a horizontal position, the three blades will, at their forward ends, assume the position shown in Figure 8, and at their rear ends the position as indicated in Figure 9. The blades will not touch any other portions of the shell.

As a result of this arrangement, the uppermost blade of the three will be arranged in the longitudinal center and in alinement with the opening 7 of the chuck 6, for the distance between the flat sides of the opening 22ᵃ is, as before stated, substantially five times the thickness of the single blade (Figure 8). In this position, the uppermost blade will also be alined with the slots 20 of the change-shell, so that when the tool is tilted downwardly to cause the forward end of the blade to slide outwardly by gravity, through the opening of the chuck, its enlarged end will easily pass through the slots 20 without touching the sides. By reversing the position of the tool so as to cause the other end blade to assume the uppermost position, that blade may be projected from the tool in the same manner. If it be desired to project the central blade of the three, the tool is given a quarter turn, so as to bring the straight sides of the opening 22ᵃ in alinement with the straight portion at the other end of the shell and in a vertical position, whereupon the front end of the central blade will drop to the lowest point of the curved portions of the opening 22ᵃ, while the rear ends of all three blades will hang onto the bar 12 with their centers of gravity so placed practically vertical (Fig. 8ᵃ). As the central blade is also the one having the widest and also the heaviest front end, there will be a determination of the point of this blade toward the center of the tool, while the rear end is only the width of a blade out of center and is free to assume a central position, as the central blade slides outwardly through the opening provided in the chuck, the enlarged end of the blade engaging in the slots 20 of the change-shell, as before.

Thus it will be seen that the positioning or indexing of the blades is accomplished by altering the position of the tool so as to cause flat sides of the blades to assume a horizontal position when either of the end blades is desired to be selected, or to assume a substantially vertical position when the central blade is to be withdrawn.

In assembling the screw driver structure, the change-shell 9 with its sleeve 11 is first inserted into the handle or casing. Then the cap 5 is screwed onto the change-shell, the chuck 6 being removed. The blades are then dropped singly into the magazine. The widest blade is put in the center. They are then given half a turn and on sliding back are alined on the bar 12. The chuck 6 is then screwed into the upper end of the sleeve 5, with the slot 7 of the chuck located at right angles to the length of the transverse bar 12. By giving it a half turn when the blades are all in the magazine, they are locked in and cannot possibly escape until the chuck is again turned so as to bring its opening 7 into alinement therewith. The sleeve 5 may then be turned so as to carry the slots 20 of the change-shell and the slots 21 of the handle out of alinement, thereby closing the tool completely and preventing the ingress of foreign matter. The blades are numbered 1, 2, 3, and the chuck 6 and the sleeve 5 have numbers at points corresponding to the location of the blades within the shell, thereby making it possible to determine instantly which blade will issue from the shell when the tool is manipulated.

In using the screw driver, and assuming that it be desired to have the central blade projected, the chuck 6 is moved until the mark thereon coincides with the mark and number on the sleeve 5, whereupon the sleeve is rotated to turn the change-shell until the slots 20 in the change-shell coincide with the slots 21 in the casing or handle. The tool is then moved until the desired number on the sleeve 5 is straight up and is then tilted head down, when the desired blade slides out through the chuck. The sleeve 5 is then pulled out far enough to bring the end of the blade clear of the handle and then given a half turn, when the basic end of the blade will become firmly seated in the slots 21$^b$ in the handle. The pressure of the spring 14 keeps the blade firmly in position, and the action of working the screw driver can only serve to press the blade still harder into the slots 21$^b$, making it impossible for the blade to turn or slip in the handle.

When it is desired to replace an already projected and locked blade, the sleeve 5 and handle or casing 1 are drawn apart lengthwise until the expanded end 18 of the already projected blade is moved out of the recesses 21$^b$, and the sleeve 5 and change-shell 9, being now unlocked, may be rotated about the longitudinal axis of the screw driver structure until the projected blade has its butt end in coincidence with the recesses 21, and the blade, being located with its butt end lowermost, gravitates back into the change-shell, being guided in such retracting movement by the already retracted blades on either side of it.

Figure 14:
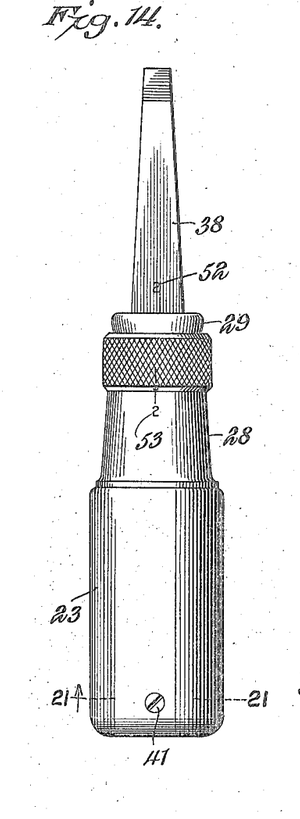
Figure 14 is an elevation of a modified form of the screw driver shown in the preceding figures.
Figure 15:
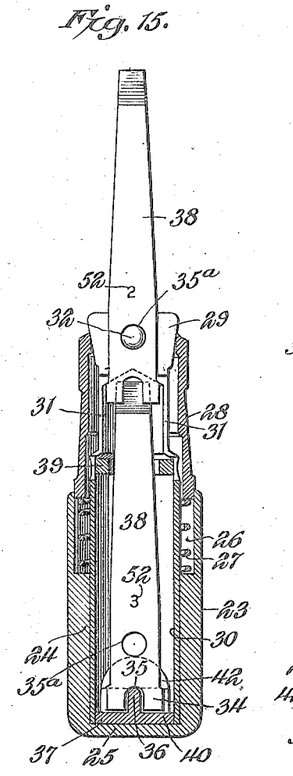
Figure 15 is a longitudinal section of the screw driver of Fig. 14.
Figure 16:
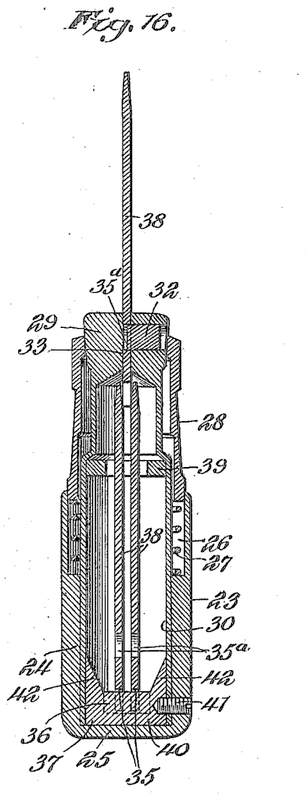
Figure 16 is a longitudinal section at right angles to the showing of Fig. 15.

In Figs. 14 to 27 inclusive, there is shown another form of the invention operating on the same general principle of positioning and changing the blades as the structure of the preceding figures, but differing in the method of holding blades. Instead of the blade when in use being set in the body of the screw driver, it is held against turning by the chuck itself. In the structure of Fig. 14 and associated figures, there is a casing or handle 23, which takes the place of the casing 1 in Fig. 1 and associated figures. This casing 23 is a one-piece structure containing a closure with interiorly thickened walls 24, and a closed bottom 25, while the end of the casing or body member remote from the bottom 25 is formed with a cavity 26, interiorly enlarged to house a spring 27.

The spring 27 receives and supports a sleeve 28 capable of movement lengthwise of the handle portion of the structure, so that the sleeve 28 may be forcibly moved to an extent into the handle in opposition to the tendency of the spring 27.

Within the sleeve 28 there is located a taper block 29 expanding toward the top and tapered outwardly and fitting the upper end of the sleeve 28 snugly. Formed in one piece with the block 29, is a change-shell 30 (see Fig. 18) which may be of cylindrical contour to a point near the bottom of the handle 23.

The shell 30 is made of metal and is provided from the lower end of the block for a distance into the shell 30 with slits 31. One side of the split block 29 is pierced by a pin 32, capable of being forced for a distance into an enlarged continuation 33 of the slit 31, so that the pin 32 may enter or seat in a hole 35$^a$ in the screw driver blade, which at the time is held in the block 29 by the clamping action of the latter.

Figure 17:
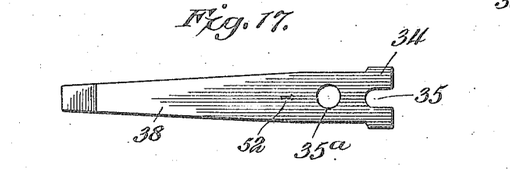
Figure 17 is a plan view of a form of screw driver blade which is used with the screw driver shown in Figures 14, 15 and 16.
Figure 18:
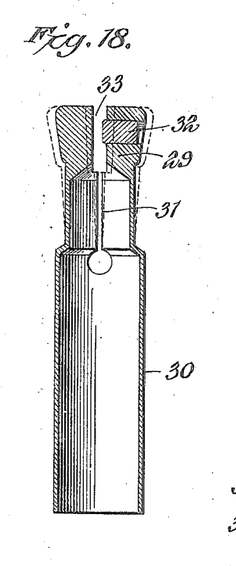
Figure 18 is a longitudinal section through the change-shell of Figs. 14 to 27.
Figure 19:
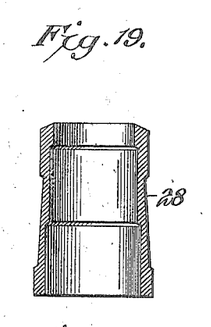
Figure 19 is a longitudinal section of a sleeve employed at the outer end of the change-shell shown in Fig. 18.
Figure 20:
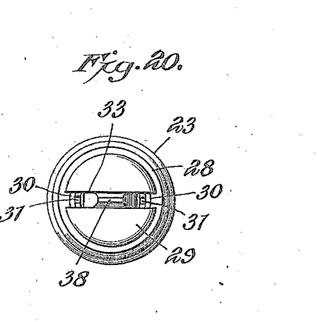
Figure 20 is a top view of the form of screw driver structure shown in Fig. 14.
Figure 21:
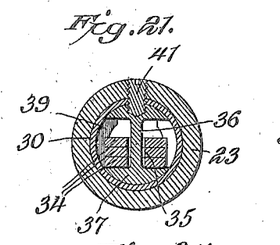
Figure 21 is a cross section on the line 21—21 of Fig. 14.
Figure 22:
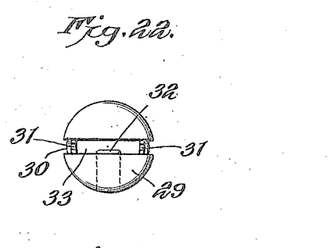
Figure 22 is a top plan view of the change-shell shown in Fig. 18.
Figure 23:
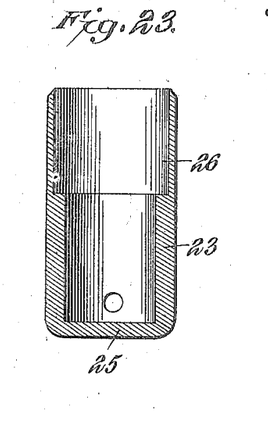
Figure 23 is a longitudinal section of the handle.
Figure 24:
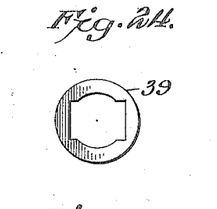
Figures 24 to 27 inclusive are views of detailed portions of the screw driver structure shown in Figures 14 to 16.
Figure 25:
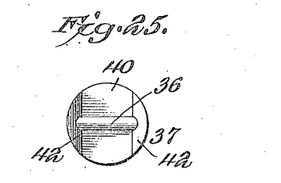
Figure 26:
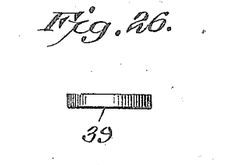
Figure 27:
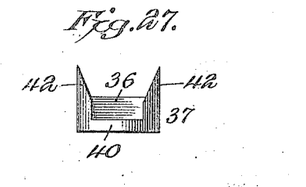

The blade is shown in Fig. 17 as having an enlarged basic end 34, with a central notch 35 at said basic end to permit those blades which are not in projective position to straddle a transverse bar 36 in the bottom of a lining member 37 lodged in the change-shell 30.

The screw driver blades indicated at 38, in Figs. 14, 15, 16 and 17, are in the main similar to the showing of Figs. 1, 2, 3 and 4, and are or may be, three in number although not necessarily confined to such particular number, and these blades are housed in the change-shell, with all the blades being projected through a ring 39 of combined circular and rectangular form, similar to the web 22, shown in Figures 1 to 13 inclusive and having the same functions.

The bar 36 rises from a plate 40, which rests on the bottom 25 of the casing 24, and this plate 40 is secured in the casing 23 by a set screw 41, which screw also serves to fasten taper projections 42 on opposite sides of and integral with the plate 40, the change-shell 30 and the outer shell 23 keeping them from turning one upon the other. The projections 42 rise along the interior of the casing, so that the screw driver blades may be suitably supported, centered, and interlocked and are similar in function to the flattened sides 11$^a$ in Figs. 3 and 5.

The selection of the blades is accomplished in this form in substantially the same manner as in the first form of the invention, it being noted in this connection that the opening defined by the ring 39 of Figures 14 to 27 inclusive corresponds with the opening defined by the web 22 of Figures 1 to 13 inclusive, while the slot 7 in the chuck 6 of the last mentioned figures corresponds with the shape of the opening in the block 29.

In order to release the desired tool, the sleeve 28 is pulled back slightly, causing the chuck 29 to open and allow the blade to slide out. On releasing the sleeve 28, the chuck jaws close, the pin 32 seating in the hole 25$^a$ provided in the blade shank. As the sleeve 28 is under constant pressure against the chuck jaws, there is no possibility of the blade slipping when it has once been properly seated.

To receive the blade into the magazine, the tool is slightly tilted backwardly, the sleeve 6 pulled down, and the blade given a slight twist to unseat it from the pin 32, when it will slide back into the magazine. Upon releasing the sleeve 28, the chuck jaws close until the sides of the slot 33 meet. When this occurs, it is impossible for a blade to pass and the blades become securely locked in the magazine.

In the form shown in Figures 1 to 13 inclusive, the sleeve 5 has to be moved longitudinally against the action of the spring and then turned, whereas in the form shown in Figures 14 to 27 inclusive, the sleeve 28 only has a slidable movement, which movement is, however, necessary in order to release the block 29, which in effect constitutes a chuck, from its engagement with the blade.

The advantages of this tool may be summed up as follows. A great deal of time is saved over the operation of the ordinary magazine screw driver. The loss of blades, a common trouble with such tools, is absolutely avoided. The construction is exceedingly simple and without any delicate parts which would be likely to cause trouble. The blades are held absolutely rigidly, and without any danger of slipping or turning. The size of the tool is not increased beyond that of the ordinary magazine screw driver, the weight is the same, and the conveniences of the tool will commend it to the public.

By the employment of gravity for indexing, positioning and selecting the blades instead of a movable mechanism, a construction has been rendered possible which permits the blades to extend practically throughout the entire length of the screw driver. This also renders possible the large size and width of blades in proportion to the handle, which would be impossible in mechanisms requiring additional moveable parts in order to index or position the blades.

What is claimed is:—

1. A magazine tool comprising a magazine shell, a plurality of blades within the shell but unattached thereto, a chuck communicating with the shell through an opening which is adapted to pass but one blade at a time, said chuck being adapted to clamp the blades singly when projected, said blades being free to move within the shell longitudinally and laterally in either of two transverse directions in response to gravity as the position of the tool may be changed, and means within the shell for restricting the movements by gravity of the blades to cause a selected one of the blades to aline with said opening in the chuck.

2. A magazine tool comprising a magazine, a plurality of blades housed therein but unattached thereto and free to move within the magazine longitudinally and laterally in either of two transverse directions in response to gravity as the position of the tool may be changed, a chuck communicating with the magazine through an opening which is adapted to permit the passage of one blade at a time, said chuck being adapted to clamp the blade when projected, means within said magazine for restricting such movements by gravity of the blades to a transverse movement to aline a selected blade with said opening of the chuck, and a longitudinal movement to cause the selected blade to issue from the magazine in a position to be clamped by the chuck.

3. A magazine tool comprising a magazine, a plurality of blades free to move within the magazine both longitudinally and transversely in response to gravity as the position of the tool may be changed, a chuck communicating with the magazine through an opening which is adapted to permit the passage of one blade at a time, means within said magazine for restricting such gravity movements of the blades to a transverse bodily movement of the blades with the blades lying one upon the other, or to a transverse bodily movement of the blades with the blades side by side, these movements being effected by turning the tool and causing the alinement of the selected blade with said opening, the selected blade being then permitted a longitudinal movement through said opening to an engaging position with said chuck.

4. A magazine tool, comprising a magazine, a plurality of blades therein, a chuck communicating with one end of the magazine through an opening which permits the passage of but one blade at a time, and means within the magazine whereby upon turning the same the blades are caused to move bodily within the handle transversely and lie one upon the other so as to bring either end blade into alinement with the said opening, or upon further turning movement of the magazine the blades are caused to assume a position side by side, the middle blade then alining with said opening, the actual discharge of the selected blade from the magazine being effected by the tilting of the tool.

5. A magazine tool comprising a magazine, a plurality of loose blades therein, a chuck communicating with one end of the magazine through an opening which permits the passage of but one blade at a time, said magazine having means to restrict the blades to two transverse bodily movements of all the blades and the longitudinal movement of one of the blades, the transverse movements being followed to select one of the blades and bring it into alinement with the said opening, and the longitudinal movement permitting the seleted blade to pass through said opening into clamping position for the chuck.

6. In a multiple tool comprising a magazine shell, and a chuck opening into the magazine and adapted to clamp one blade at a time, a plurality of blades free to execute movements within the shell longitudinally and laterally in either of two transverse directions in response to gravity, and means within the magazine for confining said movements to compel a selected blade to aline with the chuck opening at the option of the operator.

7. A multiple tool comprising a magazine handle, a chuck having an opening for holding one blade at a time and connecting with the handle, a plurality of blades housed within the handle, and means for simultaneously alining a blade selected for use with the opening in the chuck and freeing said tool ready for issuance into the chuck, through the application of gravity on turning the tool as a whole.

8. In a hollow-handled tool, a plurality of blades normally housed in the handle and capable of simultaneous transverse and lateral movements in the tool, and relatively fixed means contained within the handle for selectively positioning one of the blades prior to projection from the handle into the operative position.

9. In a multiple tool having a magazine adapted to completely house a plurality of loose blades, means to issue each blade one at a time into the working position centrally of the tool, and means for clamping it there, the blades remaining in the magazine overlapping at their outer ends within the magazine the inner end of the blade thus clamped.

10. In a magazine tool containing a plurality of blades, relatively fixed means within the magazine by which any blade can be selectively positioned for issuance into the working position, a chucking mechanism adapted to clamp the blade chosen for use, and means for simultaneously retaining the outer ends of the remaining blades within the area of the butt end of the blade in use.

11. In a multiple tool, a hollow handle, a magazine shell containing a plurality of blades, said shell being slidable and rotatable in the handle, means for imparting spring pressure to the shell, means permitting the selection and projection of any one of said blades into the working position or its retraction, and means for clamping it in the working position by sliding and turning the magazine shell.

12. In a hollow handled tool, a plurality of blades housed in the handle, said handle having means to permit coordinated transverse movements of all the blades therein through the force of gravity to selectively position one of the blades for projection from the tool, said handle having an opening at the forward end to pass the working end of the chosen blade into position for projection, and means for clamping the projected blade against retraction.

13. In a multi-bladed tool, a hollow handle, three overlying loose flat tool blades normally housed in the handle, said handle having means to permit a combined and simultaneous movement transverse of said blades in said handle equal to several times the thickness of a blade to register a chosen one of the blades with the longitudinal center line of the handle, and the hollow handle having a forward passage for issuing the registered blade into the projected position when the handle is tipped downwardly, and means for clamping the projected blade against retraction.

14. In a magazine tool, a hollow handle having an opening through it at the forward end and of a capacity to receive a plurality of entirely unattached tool blades housed within the magazine, and means associated with the handle to allow the blades to be selectively positioned one at a time by the action of gravity in the longitudinal center line of the tool and subsequently projected from the handle, said means including devices cooperating with the chosen blade for locking said blade in the projected position.

15. In a magazine tool, a hollow handle, a plurality of entirely unattached flat blades normally housed in the handle, said handle having an opening through its forward end to pass one blade at a time, the handle being of a length substantially that of a blade.

and means associated with the handle to allow the blades to be chosen and made ready for issuance one at a time, by turning the tool, and then projected individually from the handle by tipping the tool, the blade and handle having cooperative means to lock the blade in the projected position.

16. In a magazine tool having a hollow handle, a plurality of entirely unattached flat blades therein, said handle having a tool-passing orifice at its forward end, and means for causing the alinement by gravity of any chosen blade with the tool-passing orifice in the handle prior to and independent of any longitudinal movement of the blades while preventing the remaining blades from alining with the tool-passing orifice, the chosen blade being projected through said orifice by gravity, and means formed partly in the handle and partly on the blade to lock the latter in its projected position.

17. In a multiple bladed tool, having a hollow handle for housing a plurality of flat blades which are wholly unattached in face to face relation and engagement, means at the forward end of the handle and provided with an opening therethrough to pass a single blade at one time, means for positioning a chosen one of the blades and for freeing it ready to issue by causing it to aline with said opening on turning the entire tool about its longitudinal axis, means for causing the issuance of the blade by gravity on tipping the tool, and means for locking the blade in its projected position.

18. A screw driver structure comprising a handle with a plurality of loose flat blades each of a length substantially that of the handle and each having a widened butt end, means for holding the blades normally in face-to-face relation within the handle and cooperating to first aline and then guide a chosen one of the blades into projecting relation through the front end of the handle and back again while the other blades are, in the meantime, retained in the handle, the projection of the chosen blade being caused by gravity, and means engaging the blade to lock the latter in projected position.

19. A screw driver structure provided with a hollow handle and a plurality of flat screw driver blades loosely lodged therein, means for selectively positioning any one of the blades by turning the structure as a whole while the blades are within the handle and permitting the selected blade to be subsequently projected by gravity from the handle, and means cooperating with the handle and selected blade to lock the latter in the projected position to the exclusion of the other blade or blades, the inner end of the projected blade extending beyond and overlapping the forward ends of two adjacent blades and guided thereby when being retracted into the handle.

20. In a multi-bladed tool, a hollow handle having the inner end closed, a plurality of flat blades therein each with a slotted base, a chuck at the outer end of the handle with an orifice therethrough to pass a single blade at a time and clamp the blade in projected position, and a transverse bar at the inner end of the handle to fit in and engage the slots of all the blades when in their retracted positions.

21. A multiple screw driver structure, comprising a hollow handle, a plurality of related blades therein, a clamping mechanism at the forward end of the handle having a contracted orifice capable of passing but one blade at a time, means at the front and rear of the handle for holding the blades in face-to-face relation, said means permitting engagement between and transverse movements of the blades whereby they coact and cooperate to aline one of the blades with said orifice, and said clamping mechanism having means for clamping a projected blade and preventing its complete escape from the handle.

22. A multiple screw driver, comprising a hollow handle, a plurality of flat blades therein, each with a widened, slotted base, a chuck with a slot therethrough to pass a single blade at a time, means for clamping a projected blade, and means coacting with the slots of the blades while the latter are in their retracted position to prevent turning of the blades about their longitudinal axis.

23. In a multi-bladed tool, a hollow handle, a change-shell within the handle and contracted in diameter at the inner and outer ends, a plurality of loose blades contained within the change-shell, the combined thickness of the blades being less than the contracted diameter of the change-shell, so as to allow a combined movement of the blades within the change-shell in one direction equal to substantially the thickness of two blades, means at the forward end of the handle to allow for the projection of a single blade only, and means at said forward end for clamping the blade in its projected position.

24. In a multi-bladed tool, a hollow handle, a longitudinally slidable sleeve, a plurality of loose blades contained within the handle, means for holding said blades in face-to-face relation and in interlocked engagement with an element carried by the handle, whereby the blades are held from axial turning and are permitted to move bodily transversely within the handle, a spring contained within the handle and acting against the longitudinally slidable sleeve, means coacting with said sleeve to lock a blade in projected position, said sleeve being slidable to release the blade from its locked position.

25. In a multi-bladed tool, a hollow handle, a change-shell contained within the handle, a plurality of loose blades mounted within the change-shell, means cooperating with the inner ends of the blades to interlock the same with the shange-shell, whereby the blades are held from turning movement and are permitted to move bodily transversely within the handle, means at the forward end of the change-shell providing a contracted passage for the outer ends of the blades, a chuck having an opening through which a chosen blade may be passed, said chosen blade being held in projected relation with its inner end within the change-shell fitted between the outer ends of the two adjacent blades and guided thereby into its retracted position.

26. In a multi-bladed tool, a hollow handle, a change-shell within the same, said change-shell having its diameter contracted in one direction at the inner end, a plurality of loose blades contained within the change-shell, means for holding the blades from rotation within the change-shell, but permitting the simultaneous lateral movement of all the blades therein, means at the forward end of the change-shell for reducing the diameter thereof at that end in coincidence with the said contraction of the inner end, the blades when in their retracted position projecting beyond the last-mentioned means, a chuck provided with an opening to allow for the projection of a single blade, and means connected with the chuck for locking the blade in its projected position.

27. The combination with a hollow handle or casing open at its front end, of a change shell within the handle, loose blades within the change shell, fixed means carried by the change shell to adjust the forward ends of the blades so that at least one of the blades will be in alinement with the longitudinal central line of the tool, means at the rear end of the casing or hande to correspondingly adjust the rear ends of said blades, and a clamping mechanism associated with the casing or handle, said clamping mechanism having an opening of a size to permit the passage of a single blade into clamping relation.

28. The combination with a hollow handle or casing open at its front end, a clamping mechanism at said end of the handle or casing having an opening of a size to allow for the passage and the clamping of a single blade, a change shell within the casing or handle, a plurailty of loose blades within the change shell projecting at their forward ends beyond the latter, means provided at the forward end of the change shell to adjust the forward ends of the blades so that at least one of the blades will be in alinement with the opening in the clamping mechanism, and means at the rear end of the handle or casing to correspondingly adjust the rear ends of the blades.

29. The combination with a hollow casing or handle, a chuck at one end of said casing or handle having an opening to permit the passage and the clamping of a single blade, a change shell within the casing or handle, a plurality of loose blades within the change shell, each blade being provided with a slot at the butt end, a cross bar at the innner end of the casing or handle to engage the slots at the butt ends of the blades, and means within the casing or handle to adjust the blades so that at least one of the blades will be in alinement with the opening in the chuck.

30. The combination with a hollow casing or handle open at its front end, of a change shell within the casing or handle, means within the change shell at the forward end to provide for the passage of the forward ends of the blades, said means consisting of an opening which is widened in two transverse directions, means at the inner end of the handle or casing to adjust the rear ends of the blades coincidently with their forward ends, and a chuck for holding the selected blade in its extended position.

31. The combination with a hollow casing or handle open at the front end, of a change shell within the same, a plurality of loose blades within the change shell, the forward end of the change shell being provided with an opening which is widened in two transverse directions for the passage of the front ends of the blades, means at the inner end of the casing or handle to adjust the inner ends of the blades coincidently with the walls of said opening, and a clamping mechanism at the outer end of the tool having an opening of a size to permit the passage and the clamping of a single blade.

32. The combination with a hollow casing or handle open at the front end, of a change-shell within the casing or handle and projecting at its front end beyond the same, a sleeve surrounding the change-shell at its front end, a spring interposed between the change-shell and the casing or handle, a series of loose blades contained within the change-shell, means at the inner end of the change-shell to prevent the turning of the blades, means at the front end of the change-shell having an opening with two straight sides and two curved sides for the passage of the front ends of the blades, a chuck at the outer end of the tool beyond the last mentioned means, said chuck having a slot of a size to permit the passage of a single blade, and means at the inner end of the shell to aline the blades with the straight sides of said opening.

33. The combination with a hollow handle or casing open at its front end and provided at said end with two pairs of slots, one pair being arranged at right angles to the other pair and being wider and longer than said other pair, of a change-shell located within the casing or handle and extending beyond the front end of the latter, said shell being provided at its front end with an opening which has two straight sides and two curved sides, and having longitudinal slots in its walls, a plurality of loose blades adapted to be inserted and held within the change-shell, said blades having their butt ends expanded and provided with a slot, a cross bar at the inner end of the change-shell to fit in the slots of said bades, means at the inner end of said change-shell adjacent said cross bar to contract the diameter of said change-shell, a longitudinally adjustable sleeve connected to the outer end of the change-shell and cooperating to hold the butt end of one of the blades in one pair of said notches, and a chuck engaged with said sleeve and provided with an opening for the passage of a single blade.

In testimony that I claim the foregoing as my own, I have hereto affixed my signature.

HENRY SIMON.